Jan. 20, 1931.                E. WANAMAKER                1,789,571
       MEANS FOR PROLONGING THE LIFE OF CAR LIGHTING GENERATOR BELTS
                          Filed June 28, 1928
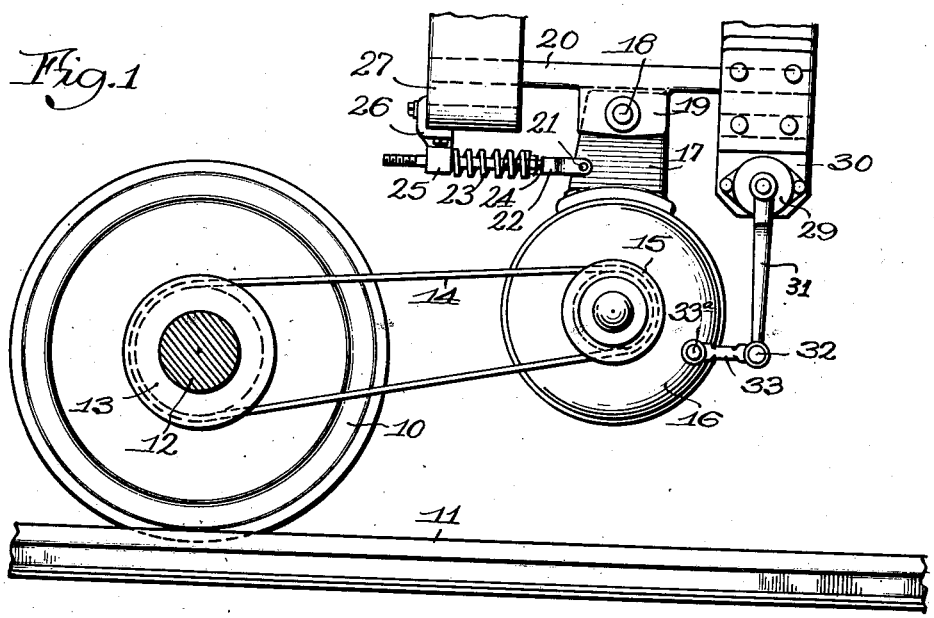
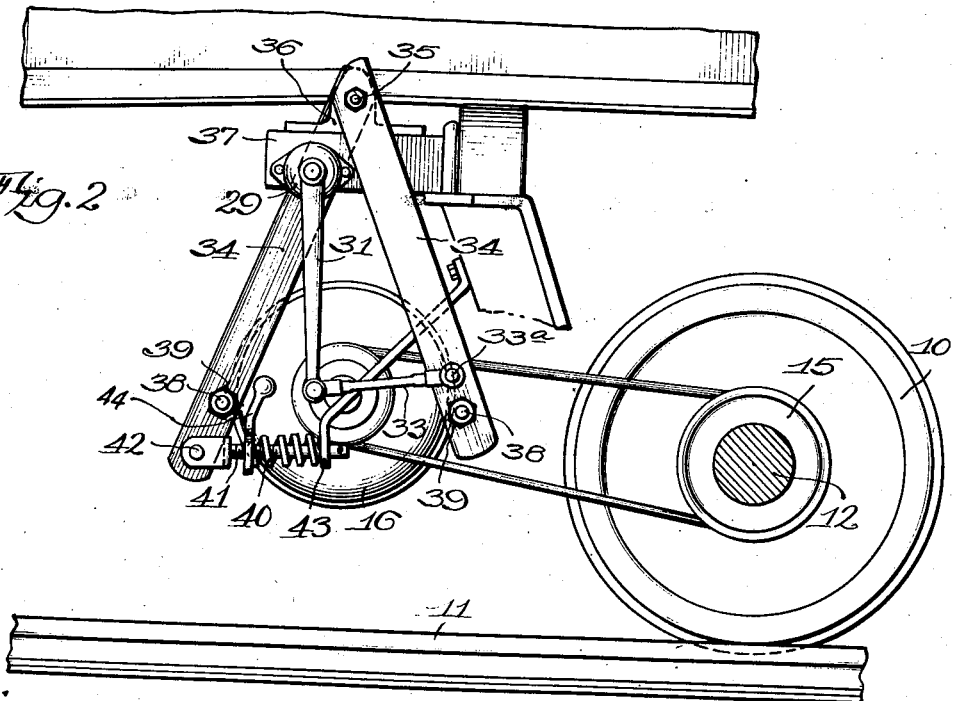
Witness:                                    Inventor,
Chas. P. Koursh                         Ernest Wanamaker,
                                      George Bayard James
                                                    Atty.

Patented Jan. 20, 1931

1,789,571

UNITED STATES PATENT OFFICE

ERNEST WANAMAKER, OF CHICAGO, ILLINOIS, ASSIGNOR TO U. S. OIL AND SERVICE CORPORATION, OF NEW YORK, N. Y., A CORPORATION OF NEW YORK

MEANS FOR PROLONGING THE LIFE OF CAR-LIGHTING-GENERATOR BELTS

Application filed June 28, 1928. Serial No. 289,053.

This invention relates to improvements in means for prolonging the life of belts of car lighting generators. The lighting generators of railway cars at the present time are generally driven by means of belts from pulleys mounted on the axles of the car trucks. In some instances the generators are supported from the under-frame of the car and in other instances are carried on the truck frame and it is necessary to provide for pivotal or swinging movement of the generators to accommodate the changing relation between the generator and the truck due to curves in the track and other conditions as will be apparent.

It is also common construction to employ a spring which urges the generator in a direction away from the driving pulley for the purpose of keeping the belt tight whether the generator is mounted pivotally or arranged to slide horizontally. As the generators are quite heavy, sometimes weighing as much as five or six hundred pounds, it will be seen that sudden starting and stopping of the cars imposes great stresses on the belt. When a car is jerked forward, as during switching the same in the yards, or in starting the train, the generator tends to move on its pivotal or sliding support against the action of the spring. This movement of the generator, if in one direction, must be restrained by the belt, or if in the other direction, by the spring, and if the latter is compressed or distended, it subsequently forces the generator back to normal position, the force of which backward movement is imposed upon the belt. It will be seen, therefore, that the imposition of these stresses upon the belt, during the starting and stopping of the trains, is one of the main reasons why the belts and belt fasteners frequently fail.

The principal object of the invention, therefore, is to provide means for prolonging the life of the generator belt by preventing the imposition of excessive stresses upon the same, due to the movement of the generator caused by sudden starting and stopping of the car.

A more specific object relates to the provision of a stress absorbing device which initially resists the sudden movement of the generator upon its mounting, but which is sufficiently yieldable to permit the necessary movement of the generator as the car trucks turn on curves in the track. The device also functions to cushion the return movement of the generator to normal position after being displaced therefrom by unusual stresses, thereby protecting the belt against the force of the spring which tends to urge the generator in a direction away from the pulley.

A further object is to provide a device which permits the belt tightening springs to be set at less tension, thereby prolonging the life of the belts and at the same time smoothing down the fluctuations in the generator output, which results in prolonging the life of the batteries.

In the accompanying drawings:

Fig. 1, is a broken view showing a conventional generator mounting in which the generator is pivoted to a portion of the under frame of the car and to which my improvements have been applied;

Fig. 2, illustrates the application of the invention to a different type of generator mounting also at present in common use.

In Fig. 1, 10 is a conventional car wheel which runs upon the track 11 and has an axle 12 provided with a pulley 13 over which passes the driving belt 14 to the pulley 15 of the generator 16. The generator is provided with a support 17 which is pivoted at 18 to one or more lugs 19 which are carried on the stationary part 20 on the under frame of the car.

Pivoted to the support 17 at 21, is a rod 22, around which is a coiled spring 23. This spring is disposed between an adjusting nut 24 on the rod and a second stop 25, through which the end of the rod passes. The stop 25 is carried by a bracket 26 also secured to another stationary part 27 supported on the other side of the car. The spring 23 urges the generator to the right as viewed in Fig. 1, to keep the belt tight. The nut 24 is provided for adjusting the tension of the spring as desired. As the truck of the car turns on a curve in the track, the spring urges the generator in a direction away from the truck to keep the belt tight, if the movement of the truck is such as to reduce the distance between the pulleys 13 and 15 and it likewise permits the generator to move to the left as viewed in Fig. 1, upon an opposite curve, as will be apparent.

If the car is jerked to the right, as viewed in Fig. 1, the heavy generator 16 will tend to move relatively to the axle 12 to the left, thus loosening the belt momentarily. The spring 23, however, will force the generator back to normal position, the force of which return movement will be imposed upon the belt 15. Should the car be jerked in the opposite direction, the stress generated by the tendency of the dynamo 16 to swing to the right will be imposed immediately upon the belt.

As mentioned above, these great stresses not only reduce the usefulness of a belt but frequently break the same so that the belt is lost, thus impairing the lighting system and permitting the batteries to run down in case the loss of the belt is not soon discovered.

To remedy the disadvantages of the present construction, I provide a yielding or stress absorbing device indicated generally by the numeral 29, which is secured to a stationary part 30 of the car. The inner construction of the absorber 29 is somewhat similar to hydraulic shock absorbers now on the market and need not be specifically described.

The shock absorbers generally employed on automobiles are provided with by-passes from the compression chambers which permit a limited free movement in both directions of the arm 31. With the present device, however, the by-passes are omitted so that no free movement of the arm 31 in either direction is permitted by the compression chambers.

One end of the arm is pivoted as at 32, to a link 33, which, in the modification shown, is also pivoted at 33a to the casing of the generator 16. The device 29, as will be seen, resists sudden movement of the generator upon its pivot 18, in either direction, but should the stresses be sufficient to overcome the resistance offered by the device, the return movement of the generator to normal position is slowed down so that the spring 23 does not cause the generator to swing back suddenly into position against the belt.

In the form shown in Fig. 2, the generator 16 is shown supported by a frame comprising members 34—34 which are pivoted at 35 to a bearing block 36 which may be mounted on the member 37 carried by a truck of the car. Two pairs of such frame members 34 are provided, one on each side of the generator, which is supported on the frames by means of transverse rods 38—38 which pass through ears 39 on the generator casing. This construction permits the generator to be shifted laterally for aligning the same properly with respect to the pulley 15 mounted on the axis of the wheels 10. This feature of the construction forms no part of the present improvements but is illustrated merely for the purpose of showing the adaptability of the present improvements to various conventional forms of generator mountings.

The supporting frame 34 is urged to the left as viewed in Fig. 2 upon the pivot 35, by means of a spring 40, carried upon the rod 41 which is pivoted to one of the frame members at 42. The spring abuts against the end of a stop 43 which is secured to any convenient portion of the truck structure, and is adjusted by the nut 44.

The absorber 29, in this adaptation of the invention, may be bolted to the member 37, and the arm 31 pivoted to the link 33 which in turn is pivoted at 33a to one of the frame members 34. As will be apparent, the spring 40 tends to move the supporting frame and generator to the left as viewed in Fig. 2 to tighten the belt, but is compressible when the frame and generator are moved to the right when the truck takes a curve or when the car is jerked to the right. The absorber 29, however, functions as described above, tending to initially resist the sudden swinging of the generator but where the force imposed is sufficient to actually overcome the resistance of the device 29, the latter cushions the return of the generator to normal position under the action of the spring.

With the present improvements, less spring tension may be maintained, with the result that the belts give longer service. When snow, ice, mud, pieces of ballast or other foreign materials lodge upon the inner face of the belt and are carried around the pulleys, the absorber yields sufficiently to accommodate the necessary movement of the generator.

In the use of the present improvements not only has there been a reduction in actual breakage of belts, but the tension of the belts has been more uniform and consequently there has been less slippage of the belt on the pulleys whereby less variation in the voltage output of the generators has been effected, which results in longer battery life.

Although I have shown and described the present invention as applicable to certain types of generator mountings, for the purpose of illustration, I do not wish to be restricted to the specific constructions herein disclosed, except where limitations thereto appear in the appended claims.

What I claim is:

1. In combination, a belt driven generator pivotally supported for movement in either of two directions, a spring for urging the generator in a direction to tighten the belt, and a relatively stationary hydraulic device having an actuating arm linked in operative relation with the generator for initially resisting sudden movements of the generator in either direction and cushioning the return movement thereof to normal position.

2. The combination with a pivotally mounted car lighting generator, a belt therefor driven from a pulley on an axle of the car truck, a spring for urging the generator in a direction to tighten the belt, and a hydraulic device secured to a relatively stationary support and comprising a casing completely enclosing a liquid resistant member, and an oscillatable arm operatively engaging said member and said generator to yieldingly resist sudden movement of the generator on its pivot in either direction and to cushion the return movement of the generator from abnormal to normal position under action of said spring.

3. In car lighting equipment, in combination, a generator, means for pivotally supporting said generator in position to be driven from an axle of the car and adapted to permit said generator to swing toward or away from the car axle, a hydraulic shock absorber device having two relatively rotatable members for opposing swinging movement of said generator, means causing one of said members to rotate with said generator, and means for holding the other of said members against rotation.

In testimony whereof, I have subscribed my name.

ERNEST WANAMAKER.